UNITED STATES PATENT OFFICE.

HANS KARPLUS, OF BERLIN, GERMANY.

PROCESS OF PRODUCING COLLOIDAL SOLUTIONS IN ORGANIC SUBSTANCES NOT MISCIBLE WITH WATER.

1,189,696.  Specification of Letters Patent.  Patented July 4, 1916.

No Drawing.  Application filed June 26, 1915.  Serial No. 36,569.

*To all whom it may concern:*

Be it known that I, Dr. HANS KARPLUS, a citizen of Austria, residing at 36A Schöneberger Ufer, Berlin, in the German Empire, have invented new and useful Improvements in Processes of Producing Colloidal Solutions in Organic Substances Not Miscible with Water, of which the following is a specification.

This invention has for its object to provide a novel process for producing colloidal solutions in organic substances not miscible with water.

Although many useful processes have been suggested for producing hydrosols of various technological substances, only in isolated instances have organosols been successfully produced. Particular difficulties have been experienced in manufacturing colloidal solutions in such organic liquids that do not mix with water, as for instance tetrachlorid of carbon, the chlorin-addition products of acetylene, the liquid constituents of naphtha, the terpene-hydrocarbons, aromatic hydrocarbons, such as tar oils, or the constituents of tar oils, vegetable and animal oils, and the like. Like difficulties exist with regard to colloidal solutions in semi-solid or solid organic substances, that do not, or do not completely, dissolve in water such as vegetable and animal fats, waxes, also vaseline, paraffin, etc. The simplest way for obtaining the organosol from the hydrosol, viz. by separating the water and thereupon mixing the substances completely deprived of water with the organic medium, can only lead to formation of organosols if typically reversible colloids, for instance, certain colors of complex molecular structure, are treated in this way.

It has been discovered that the colloid deprived of water can be redissolved in organic media provided the removal of the water is not carried out until the colloid has been intimately mixed with an amorphous organic compound insoluble in water. The amorphous organic compound must be able to dissolve, to macerate, or to disseminate finely in the organic medium into which the irreversible colloid is to be transferred. To attain the necessary intimate mixing of the colloid with the amorphous organic compound the latter is produced in the hydrosol as a precipitate. Preferably, such amorphous organic compounds are used as are, in a high degree, capable of entraining or absorbing the irreversible colloid. The presence of the precipitate makes it possible to evaporate the water at higher temperatures without a coagulation of the irreversible colloids; in connection therewith it will be of no consequence if the previously solid organic substance changes to the liquid state. It may be assumed that each of the ultramicroscopical particles of the irreversible colloid is surrounded by a film of the organic precipitate which during the evaporation of the water separates the particles even at increased temperatures and prevents the particles from combining to insoluble aggregates. If thereafter the product freed of water is mechanically mixed with organic substances in which those amorphous organic compounds are soluble, capable of forming a gel, or finely dispersible, then the desired organosol is obtained. The amorphous organic compound serves the office of a transferrer.

The production of the precipitate that is to entrain the irreversible colloid may be carried out in various manners. Waxes, colophonic acids, fats, high boiling alcohols or other compounds insoluble in water are dissolved in ethyl-alcohol, or acetone, or in other organic liquids miscible with water, and the hydrosol is added to these solutions while they are actively stirred. The organic compounds insoluble in water separate as finely dispersed precipitates and thereby entrain those colloids that correspond to their character. The compound precipitate is mechanically separated, for instance, by filtration or centrifugal action, washed with water and dried at a temperature of from 90° to 100° centigrade and upward. Special precautionary measures are not required during the evaporation. The water may as well be removed in another way, for instance, by depositing the precipitate upon other absorbing matter such as unburned clay. Absorption and evaporation may also be combined, and the evaporation may be carried out in a vacuum. The substance deprived of water will now dissolve in colloidal form in any organic medium in which the precipitate applied for precipitating the colloids is soluble, capable of being gelatinized, or finely dispersible. In many cases better results still may be obtained by producing the organic precipitate in the hydrosol in the following manner: An aqueous solution of an organic compound soluble in water is first mixed with the hydrosol, or the organic compound is dissolved in the hydrosol and thereupon converted into an insoluble compound which is deposited as an amorphous precipitate by addition of acids, bases, or salt solutions. For instance, water soluble salts of aromatic hydroxy compounds, saturated or unsaturated, aliphatic acids or hydroxylated or halogen substituted fatty acids, or the alkali-salts of colophonic acids, oxidized train-oil acids, sebacic sulfuric acids, or other sulfo-acids of complex molecular structure are dissolved in a hydrosol, and a precipitate is then produced by addition of mineral acids or aqueous solutions of alkali earth salts, or heavy metal salts. Especially well suited are the salts of the naphthalic acids, and the nitro-acids of the high boiling naphtha fractions since their alkali salts are soluble in water and will be precipitated from these solutions by solutions of heavy metal salts, such as copper-salts, chromic-salts, ferric-salts, nickel-salts and aluminium-salts, as amorphous precipitates which are readily soluble in various hydrocarbons. In such cases the precipitate may also be produced separately and may then be mixed with the hydrosol.

The formation of the insoluble compounds precipitating as amorphous compounds may be effected in any desired manner by any appropriate reaction. Indigo white, for instance, may be dissolved in a hydrosol, and the formation of the precipitate may be produced by blowing-in air. Indigo, for example, is soluble in petroleum. The formation of the precipitate may also be obtained without a chemical conversion by means of heat or coagulation through an electrolyte.

In many cases only hydrosols containing protecting colloids are available, either because the colloidal substance cannot be obtained as a hydrosol free of protecting colloids, or will be very unstable in such a state, or because the commercial colloidal compounds which, as a rule, are almost always provided with a protecting colloid, are used. The presence of protecting colloids in the aqueous colloidal solution necessitates no modification of the method, since the compound precipitate, according to this process, may be produced advantageously in such a manner that the protecting colloids do not mix therewith.

This process may be applied for manufacturing organosols of chemical elements, such as Se, Te, Ag, Hg, Bi, C, W, Os, etc., or organosols of inorganic compounds, such as $Al_2O_3$, $ZnO$, $TiO_2$, $HgCl$, $HgO$, $SiO_2$, $SnO_2$, $As_2S_3$, $BaSO_4$, etc., or organosols of organic compounds, such as calcium oxalate, cyanid of silver, sulfocyanid of silver, and ferro-cyanid of copper. However, it is not contemplated to apply this process to typically reversible organic colloids, such as gelatin, albumin and decomposition products of albumin, colloidal carbohydrates, etc., and also not to, for instance, organic dies of complex molecular structure, which in an anhydrous condition spontaneously dissolve in organic substances not miscible with water.

The products manufactured in accordance with this process are intended to be applied for the following technological purposes:

1. Colloidal solutions of chemical elements such as, for instance, S, Se, Te, Ag, Hg, Bi, Os, or of inorganic compounds, such as calomel, mercuric oxid, and the like, in vegetable or animal fats, oils, waxes, vaseline, paraffin, lanolin, etc., may be employed, *inter alia*, for pharmaceutical purposes.

2. Colloidal solutions of graphite, talcum, or similar lubricative substances, or mixtures of such substances, in lubricating oil, consistent lubricating fats, etc., may be used as lubricants.

3. Colloidal solutions of metals (for instance, Ni, Pt, Pd, etc.) or metallic oxids (for instance, NiO) may be employed as catalytic agents in processes of hardening fats.

4. Colloidal solutions of yellow chromate of lead and other mineral colors, in linseed oil, varnish, etc., may be used as oil-colors of eminent covering power which, moreover, have the advantage over those oil-colors obtained by mixing dry coloring substances with oil, that they do not at all, or do but uncommonly slowly, segregate the solid coloring matter through dissociation.

Example: To transfer colloidal silver (for instance colloidal silver according to Bredig, Paal, Credé) out of water into vaseline, so much naphthenate of sodium is dissolved in the hydrosol that for every 10 grams of dissolved silver there are from 0.2 to 1 grams of naphthenate. Thereupon the naphthenate is completely precipitated by means of copper-salts, chromic-salts, or ferric-salts. A precipitate results which contains the silver in intimate mixture with the heavy-metal-naphthenate. The precipitate is filtered off, thoroughly washed and quickly dried at 90° to 100° centigrade in a drying-closet. To obtain a quick drying the substance to be desiccated is preferably spread out in a thin layer. The substance completely deprived of water, is then thoroughly mixed with vaseline in a mortar.

What I claim is:

1. A process of producing a colloidal solution in an organic medium insoluble in water from a hydrosol consisting in removing the colloid from the hydrosol by means of an organic compound insoluble in water and dispersible in the organic medium, removing the water, and admixing therewith the organic medium.

2. A process of producing a colloidal solution in an organic medium insoluble in water from a hydrosol consisting in forming in the hydrosol a precipitate of an organic compound insoluble in water and dispersible in the organic medium, thereby entraining the colloid, removing the water from the mixture of the organic compound and the colloid, and admixing said mixture with the organic medium.

3. A process of producing a colloidal solution in an organic medium insoluble in water from a hydrosol consisting in forming in the hydrosol an amorphous precipitate of an organic compound insoluble in water and soluble in the organic medium, thereby entraining the colloid evaporating the water from the mixture of the organic compound and the colloid, and admixing said mixture with the organic medium.

4. A process of producing a colloidal solution in an organic medium insoluble in water from a hydrosol consisting in adding to the hydrosol a solution of an organic compound, converting said organic compound into an amorphous precipitate soluble in the organic medium entraining therewith the colloid, removing and drying the precipitate with the entrained colloid, and admixing the resulting mixture with the organic medium.

5. A process of producing colloidal solution of silver in vaseline from a silver hydrosol consisting in dissolving sodium naphthenate in said hydrosol, converting said naphthenate into a metal-naphthenate insoluble in water and soluble in vaseline, said precipitate entraining the colloidal silver, filtering and drying the precipitate, and mixing the dried precipitate with vaseline.

6. A colloidal solution consisting of vaseline, colloidal silver, and a metallic naphthenate insoluble in water.

7. A colloidal solution consisting of vaseline, colloidal silver, and a metal-naphthenate insoluble in water, the amount of naphthenate being less than one tenth that of the silver.

In witness whereof I have signed my name in the presence of two subscribing witnesses.

Dr. HANS KARPLUS.

Witnesses:
 Woldemar Haupt,
 Henry Hasper.